US012262458B2

(12) United States Patent
Moloney

(10) Patent No.: US 12,262,458 B2
(45) Date of Patent: Mar. 25, 2025

(54) REMOVABLE MEMBER FOR AN AEROSOL PROVISION DEVICE

(71) Applicant: NICOVENTURES TRADING LIMITED, London (GB)

(72) Inventor: Patrick Moloney, London (GB)

(73) Assignee: NICOVENTURES TRADING LIMITED, London (GB)

( * ) Notice: Subject to any disclaimer, the term of this patent is extended or adjusted under 35 U.S.C. 154(b) by 529 days.

(21) Appl. No.: 16/766,428

(22) PCT Filed: Nov. 23, 2018

(86) PCT No.: PCT/EP2018/082412

§ 371 (c)(1),
(2) Date: May 22, 2020

(87) PCT Pub. No.: WO2019/101947

PCT Pub. Date: May 31, 2019

(65) Prior Publication Data

US 2021/0030059 A1 Feb. 4, 2021

(30) Foreign Application Priority Data

Nov. 24, 2017 (GB) ..................................... 1719579

(51) Int. Cl.
*H05B 6/10* (2006.01)
*A24F 40/20* (2020.01)
(Continued)

(52) U.S. Cl.
CPC ............ *H05B 6/106* (2013.01); *A24F 40/40* (2020.01); *A24F 40/46* (2020.01); *A24F 40/465* (2020.01);
(Continued)

(58) Field of Classification Search
CPC ........ A24F 40/50; A24F 40/485; A24F 40/46; A24F 40/40; A24F 40/10; A24F 40/20;
(Continued)

(56) References Cited

U.S. PATENT DOCUMENTS 3,200,819 A 8/1965 Gilbert
3,834,399 A * 9/1974 Beam ...................... A24D 1/14 131/195
(Continued)

FOREIGN PATENT DOCUMENTS

CN 106418725 2/2017
CN 106723360 A 5/2017
(Continued)

OTHER PUBLICATIONS

International Search Report, Application No. PCT/EP2018/082412, dated Mar. 1, 2019, 5 pages.
(Continued)

*Primary Examiner* — Michael H. Wilson
*Assistant Examiner* — Stephanie Lynn Moore
(74) *Attorney, Agent, or Firm* — Husch Blackwell

(57) ABSTRACT

A removable liner configured to be used with an aerosol provision device is provided. The device includes a chamber for receiving a replaceable consumable and the liner has dimensions to fit within the chamber of the device, between walls of the chamber and the replaceable consumable. The liner is configured to receive the replaceable consumable, in use.

22 Claims, 5 Drawing Sheets

(51) Int. Cl.

| | |
|---|---|
| ***A24F 40/40*** | (2020.01) |
| ***A24F 40/46*** | (2020.01) |
| ***A24F 40/465*** | (2020.01) |
| ***A24F 40/485*** | (2020.01) |
| ***A24F 40/51*** | (2020.01) |
| ***A24F 40/53*** | (2020.01) |

(52) U.S. Cl.
CPC ............ *A24F 40/485* (2020.01); *A24F 40/51* (2020.01); *A24F 40/53* (2020.01); *A24F 40/20* (2020.01)

(58) Field of Classification Search
CPC . A24F 42/60; A24F 1/32; A24F 40/42; A24B 15/167; A24D 1/20; A24D 1/002; A24D 3/17
See application file for complete search history.

(56) References Cited

U.S. PATENT DOCUMENTS

| | | | |
|---|---|---|---|
| 5,878,752 | A | 3/1999 | Adams et al. |
| 2008/0092912 | A1 | 4/2008 | Robinson |
| 2010/0024834 | A1 | 2/2010 | Oglesby |
| 2014/0305448 | A1 | 10/2014 | Zuber |
| 2015/0136124 | A1 | 5/2015 | Aronie et al. |
| 2015/0305409 | A1 | 10/2015 | Verleur et al. |
| 2016/0100632 | A1 | 4/2016 | Debono |
| 2016/0338412 | A1 | 11/2016 | Monsees |
| 2020/0345960 | A1 | 11/2020 | Begin et al. |
| 2021/0022395 | A1 | 1/2021 | Moloney |

FOREIGN PATENT DOCUMENTS

| | | | |
|---|---|---|---|
| EP | 2954793 | | 12/2015 |
| EP | 3050444 | A1 | 8/2016 |
| JP | 2014000420 | A | 1/2014 |
| JP | 2014533513 | A | 12/2014 |
| JP | 2017127300 | A | 7/2017 |
| KR | 20140093694 | A | 7/2014 |
| RU | 2425608 | C2 | 8/2011 |
| WO | WO-2014136872 | A1 | 9/2014 |
| WO | 2016124550 | A1 | 8/2016 |
| WO | 2016127299 | A1 | 8/2016 |
| WO | WO-2017193958 | A1 | 11/2017 |

OTHER PUBLICATIONS

Office Action for Japanese Application No. 2020-526187, mailed on May 25, 2021, 8 pages.

Office Action for Russian Application No. 2020116551, mailed on Jan. 25, 2021, 2 pages.

Office Action mailed Jun. 29, 2022 for Korean Application No. 10-2020-7014592, 24 pages.

International Preliminary Report on Patentability received for PCT Patent Application No. PCT/EP2018/082412, mailed on Jun. 4, 2020, 10 pages.

Written Opinion received for PCT Patent Application No. PCT/EP2018/082412, mailed on Mar. 1, 2019, 8 pages.

* cited by examiner

REMOVABLE MEMBER FOR AN AEROSOL PROVISION DEVICE

PRIORITY CLAIM

The present application is a National Phase entry of PCT Application No. PCT/EP2018/082412, filed Nov. 23, 2018, which claims priority from GB Patent Application No. 1719579.3, filed Nov. 24, 2017, which is hereby fully incorporated herein by reference.

TECHNICAL FIELD

The present disclosure relates to an aerosol provision device, system and method.

BACKGROUND

Smoking articles such as cigarettes, cigars and the like burn tobacco during use to create tobacco smoke. Attempts have been made to provide alternatives to these articles that burn tobacco by creating products that release compounds without burning. Examples of such products are heating devices which release compounds by heating, but not burning, the material. The material may be for example tobacco or other non-tobacco products, which may or may not contain nicotine.

SUMMARY

According to a first aspect of the present disclosure, there is provided a removable liner configured to be used with an aerosol provision device, the device comprising a chamber for receiving a replaceable consumable, wherein: the liner has dimensions to fit within the chamber of the device, between walls of the chamber and the replaceable consumable; and the liner is configured to receive the replaceable consumable, in use.

In some examples, the liner is configured to receive matter from the replaceable consumable, in use.

In some examples the liner is porous.

In some examples the liner defines one or more apertures.

In some examples the liner defines an open end, to receive the replaceable consumable, in use. For example, the liner may be sleeve-like, where one end of the liner defines an aperture, and the other, opposite end, is closed.

In some examples, the liner comprises a thermally insulating material. In some examples, the liner also comprises electrically insulating material.

In some examples the thermally insulating material comprises at least one of paper, cardboard, and plastic.

In some examples the liner is a composite or hybrid of different materials. For example, the liner may comprise ceramic, paper, plastic or cardboard material in combination with a thermally conductive material, such as a metal.

In some examples the liner comprises a thermally conductive material configured to transfer heat from a heater in the device to the replaceable consumable. In some examples the liner may be entirely constructed from conductive material, however in other examples the liner may only partially be constructed from conductive material. In one example, the thermally conductive material is arranged at one or more suitable locations within, or along the liner to allow heat to be transferred from the heater to the consumable.

In some examples, walls of the liner comprise thermally conductive regions comprising the thermally conductive material disposed therein. Therefore, in some examples, the walls of the liner are not entirely thermally conductive at all positions and the thermally conductive material is disposed throughout walls of the liner. For example, conductive bars, filaments, or sections may allow heat to flow through the walls, from an outer surface to an inner surface, at these positions.

In some examples the liner comprises a region of thermally insulating material located at, or towards, an end of the liner that receives the replaceable consumable. In one example, the thermally insulating region may be located at a top end of the liner. This thermally insulating region may be exposed even when the liner is inserted into the device, however in other examples this region is fully or partially received in the device. In one example, the liner is entirely thermally conductive apart from the region comprising thermally insulating material.

In some examples the liner comprises a locking feature, where the locking feature is configured to engage a locking assembly of the device to restrict removal of the liner from the device. A corresponding locking assembly within the device may interlock with the liner.

According to a second aspect of the present disclosure there is provided a system comprising: an aerosol provision device, the device having a chamber for receiving a replaceable consumable; a replaceable consumable at least partially disposed within the chamber; and a removable liner disposed between walls of the chamber and the replaceable consumable, wherein the removable liner at least partially surrounds the replaceable consumable, in use.

In one example the liner comprises a thermally conductive material, and the device comprises a heater arranged such that the thermally conductive material transfers heat from the heater to the replaceable heater, in use.

In some examples, the device comprises a locking assembly configured to restrict removal of the liner from the chamber until at least one of: the thermally conductive material has reached a threshold temperature; and a threshold period of time has elapsed.

In one example the threshold period of time is defined as the time elapsed from when the heater was last switched off.

In another example, the device further comprises a temperature sensor, and the locking assembly is configured to restrict removal of the liner from the chamber until the temperature sensor indicates that the liner has reached the threshold temperature.

In some examples, the liner comprises a locking feature, configured for engaging the locking assembly to restrict removal of the liner from the chamber. Hence the locking assembly and the locking feature work in unison, to lock the liner in place. In other examples however, the liner does not comprise a locking feature that cooperates with the locking assembly. For example, the locking assembly may comprise a collar that grips the liner to hold it in place.

In some examples, the device comprises a wax actuator configured to restrict removal of the liner from the chamber until the thermally conductive material has reached a threshold temperature.

According to a third aspect of the present disclosure there is provided a method of generating an aerosol using a device, the device comprising a chamber, the method comprising: receiving a removable liner within the chamber; receiving at least a portion of a replaceable consumable within the removable liner, such that the liner is disposed between walls of the chamber and the replaceable consumable; and heating the replaceable consumable using a heater, to produce the aerosol.

In some examples the method further comprises receiving matter in the removable liner.

In some examples the method further comprises at least one of: passing air through the removable liner; and passing the aerosol through the removable liner, thereby removing one or more constituents from the aerosol.

In some examples the method further comprises passing air through at least one aperture defined by the removable liner.

In some examples receiving the at least a portion of the replaceable consumable within the removable liner comprises receiving the replaceable consumable in an open end of the liner.

In some examples the method further comprises insulating at least a portion of the receptacle from heat generated by the consumable, using the liner.

In some examples the liner comprises a thermally conductive material and the device comprises the heater, the method further comprising: transferring heat along the thermally conductive material from the heater to the replaceable consumable.

In some examples the method further comprises restricting removal of the liner from the chamber until at least one of: the thermally conductive material has reached a threshold temperature; and a threshold period of time has elapsed.

In some examples the method further comprises at least one of: monitoring a temperature of the thermally conductive material; and monitoring a time period.

In some examples the method further comprises removing the removable liner from the chamber after heating the replaceable consumable.

In some examples the method further comprises removing and disposing of the removable liner after heating the replaceable consumable.

In some examples the method further comprises removing, cleaning and replacing the removable liner after heating the replaceable consumable.

In another aspect, a system/kit is provided, wherein the system comprises a plurality of consumables and at least one removable liner as described above. The at least one removable liner is configured for use with the plurality of consumables and is configured to receive a consumable of the plurality of consumables. For example, the liner may be dimensioned to receive the consumable.

In another aspect, a system/kit is provided, wherein the system comprises a first plurality of consumables and a first removable liner, and a second plurality of consumables and a second removable liner. The first removable liner is configured for use with the first plurality of consumables and second removable liner is configured for use with the second plurality of consumables. For example, the first removable liner may be dimensioned to receive a consumable from the first plurality of consumables, and the second removable liner may be dimensioned to receive a consumable from the second plurality of consumables, where the first and second removable liners are different.

BRIEF DESCRIPTION OF THE DRAWINGS

Embodiments of the disclosure will now be described, by way of example only, with reference to the accompanying drawings, in which.

DETAILED DESCRIPTION

Figure 1:
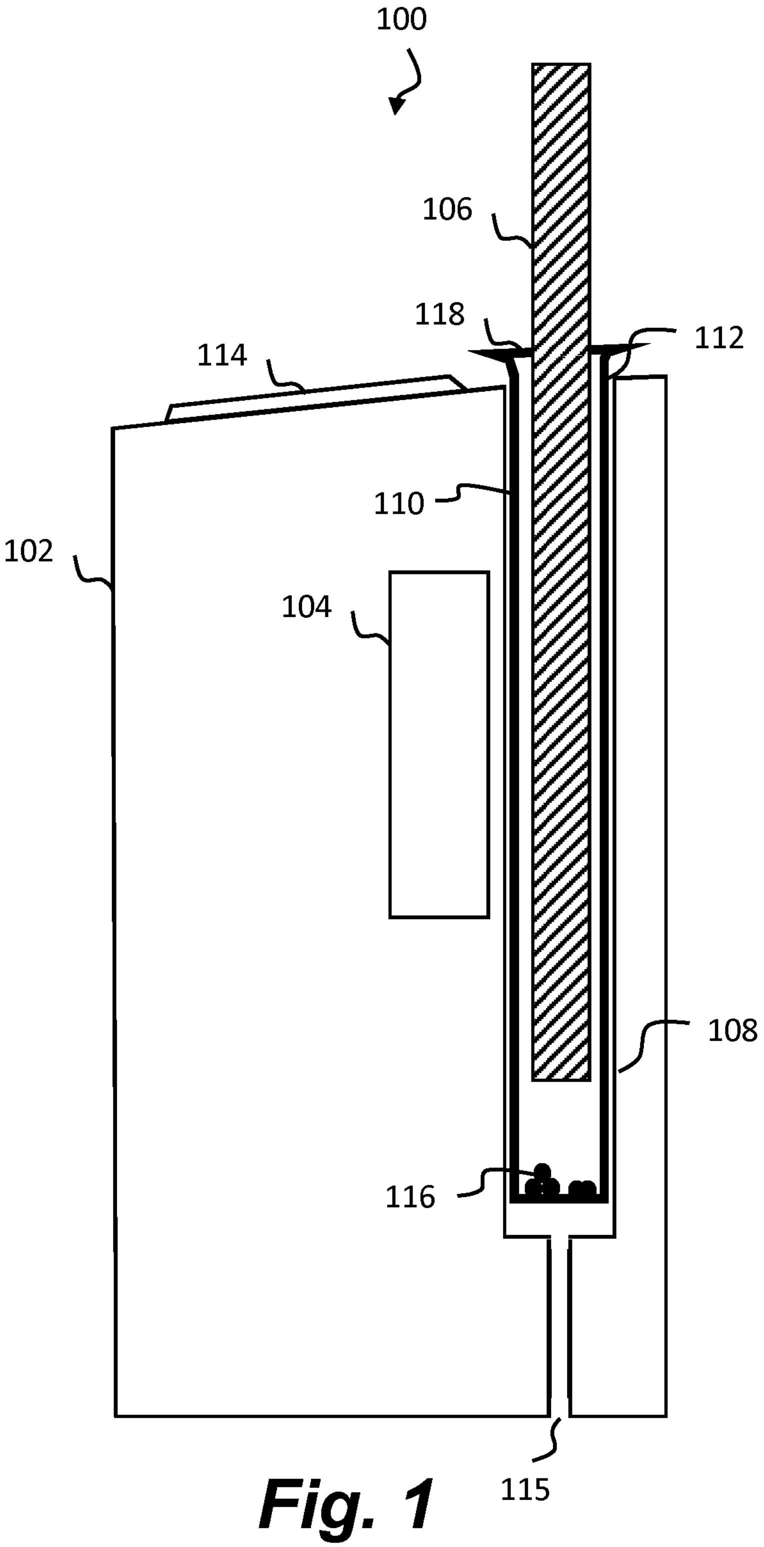
FIG. 1 shows a schematic cross-sectional view of an example of an aerosol provision device, the device comprising a removable liner.

Referring to FIG. 1, there is shown an example system 100 comprising a device 102 for generating an aerosol. The system may also comprise a replaceable consumable 106 and a removable liner 110. In broad outline, a heater 104 within the device 102 heats a substrate, such as the replaceable consumable 106, once the consumable 106 has been inserted into a chamber/receptacle 108 of the device 102. As a user draws on the consumable 106, air flows through the inlet 115 into the chamber. Once the consumable 106 is heated by the heater, a vapor or aerosol is released from the replaceable consumable 106, thereby generating an inhalable medium, such as the aerosol. In some examples the device may be known as an apparatus for generating an inhalable medium.

The heater 104 is arranged to heat the replaceable consumable 106. The heater may be powered by a battery (not shown). A control element (not shown), such as a switch, may be operated by a user to control the energy supply to the heater 104. In this example the heater is an electrically resistive heater. For example, the heater may be a nichrome resistive heater, a ceramic heater, and may also comprise carbon, graphite, or a diamond loaded material or composite, for example. In other examples however, the heater 104 may be an induction heater. Other heating arrangements may be used, including non-electrical heating arrangements. In some examples walls of the chamber 108 also form part of the heat transfer mechanism.

In FIG. 1, the device 102 comprises a housing. The housing has an open end 112 which receives the removable liner 110 and the consumable 106. In this example, the replaceable consumable 106 comprises tobacco (for example, reconstituted tobacco), and is partially inserted into the open end 112 so that it is received within the chamber 108 and the liner 110. The device may also comprise a lid, or cap 114, to cover the opening 112 when no consumable 106 is in place. In this example, the cap 114 is shown in an open configuration to allow the opening 112 to be accessed.

The removable liner is disposed between walls of the chamber 108 and the replaceable consumable 106. The liner 110 is therefore dimensioned to fit within the chamber 108 of the device 102. In some examples, the liner may have a diameter of about 0.4 cm to about 1.1 cm, and length dimensions of about 5 cm to about 10 cm, although it will be appreciated the liner 110 may take other shapes in other implementations depending on the shape of the chamber 108 and/or replaceable consumable 106.

In some examples the inner diameter of the liner 110 varies along its length. Thus, the liner 110 may receive a consumable 106 with a diameter that varies along its length. In some examples, the liner 110 has an outer diameter that is constant in size along its length, and the inner diameter of the liner 110 varies in size along its length. This allows the liner 110 to receive a varying diameter consumable, while allowing the liner to be received within a chamber 108 that has a constant diameter along its length.

In some examples a plurality of liners may be provided, where each liner within the plurality of liners has (i) a differently sized inner diameter, and (ii) an outer diameter of the same size. This allows the user to select a liner for an appropriately sized consumable so that the consumable can be used with a single aerosol provision device.

A consumable product may be, for example, of a predetermined or specific size that is configured to be placed within a chamber sized to receive the consumable product. In one example, a replaceable consumable is tubular in nature, and may be known as a "tobacco stick". In some examples the consumable may comprise tobacco formed in a specific shape which is then coated, or wrapped in one or more other materials, such as paper or foil. Accordingly, the liner may be dimensioned to receive the replaceable consumable. In one example the lining is tubular.

The use of a removable liner 110 may protect the chamber 108 from being damaged or tarnished as a result of heating the replaceable consumable 106 and/or may provide hygiene benefits. A user may first insert the liner 110 into the chamber 108 and then insert the replaceable consumable 106 into the liner 110 such that the replaceable consumable does not directly contact the inner walls of the chamber 108.

In some examples, the liner 110 is a single-use liner. A user may therefore dispose of the liner after a single session. In other examples, however, the liner may be used more than once, and is only disposed of after multiple sessions. Once disposed of, a user may replace the removable liner with a new liner. In some examples the liner is reusable; the liner may be removed from the device, cleaned, and then reinserted. In some examples the liner is affixed to, and forms a part of the replaceable consumable 106.

In some examples the liner 110 is shaped to be used with a specific type of device, such as a particular make and model of device. The liner therefore is designed to fit within the chamber 108 of the device with which it is used. The liner may also be shaped to be used with specific replaceable consumables. A system may therefore be provided which includes liners defining receptacles of different sizes. In this way the liner may function as an adaptor to allow the use of replaceable consumables of different sizes. For example, the external dimension of each liner may be the same, but the internal dimensions may differ between liners, depending on the size of consumable they are configured to receive.

In some examples the liner comprises a flavorant and/or a sensate. A flavorant is released during use, upon heating for example, and can adjust the taste of the aerosol inhaled by the user or allow a user to customize the experience depending on a particular liner which is selected. Similarly, a sensate is released during use, upon heating for example, and can adjust the sensation experienced, for example by adjusting the acidity of aerosol inhaled by the user.

In some examples, the liner may be personalized. For example, the liner may comprise materials selected by a user. Selecting certain materials can change the tactile perception of the device, for example, the device can be made heavier or lighter, by selecting specific materials. Alternatively or additionally, the liner may be processed to change its tactile and/or visible properties, such as by etching, texturing, patterning or coloring a surface of the liner. In one example, the liner's appearance is used to indicate a property of the liner, such as a flavor provided by the liner, a size of the liner, or to indicate compatibility with a particular consumable. For example, the liner may have a visual property, such as a specific color or the liner may illuminate in a particular way to indicate the visual property. Alternatively or additionally the liner may have a tactile property, such as a specific texture.

In the example of FIG. 1, the removable liner 110 comprises an open end 118 at the top of the liner 110, in which the consumable 106 is received. At the opposite, bottom end, the liner 110 is closed. This construction allows the liner to be separate from the consumable, so that the consumable is easily inserted and removed from the liner.

As mentioned, in some examples, the removable liner 110 is configured to receive or collect matter from the replaceable consumable. Loose matter 116 may fall or detach from the consumable before, during or after heating, and be collected by the liner 110. FIG. 1 shows the loose matter 116 collecting towards the closed end of the removable liner 110. As well as collecting loose matter 116, aerosol deposits may also be gathered by the liner 110. This may occur as the aerosol passes through, passes by, or is absorbed within the liner 110. For example, the aerosol may pass through a porous liner, or particles of matter may gather on, or in, the liner 110 even in instances when the liner 110 is not porous.

A user may remove the liner 110, clean the liner to remove the matter, and replace the liner 110 for subsequent use. Hence, by having an open end 118, it may provide improved means of cleaning the liner; matter can be emptied from the liner, and/or water or cleaning implements can enter the liner to remove the matter deposited therein. Alternatively, the user may discard the liner 110, and insert a new liner 110 after one or more uses. The liner may therefore be used to collect, gather or retain matter that may be released from the consumable as it is used. By receiving matter, the presence of the liner may reduce the chance of a user experiencing unpleasant tastes from previous depositions of matter being reheated, for example. The liner may also improve hygiene, by capturing matter that would otherwise be deposited within the chamber of the device. This matter can lead to bacterial growth; however, the use of a liner may reduce bacterial levels by capturing the matter which is subsequently removed from the device by removing the liner from the device.

In some examples the removable liner 110 is porous. In other examples, the liner 110 may comprise porous regions and non-porous regions. For example, the liner may be permeable to air or gas, and may be constructed from material that has gaps or openings through which air or gas can pass. In some examples, only a portion of the liner is porous. The porous liner or porous regions of the liner 110 allow air to pass from outside the device 102 through inlet 115 and through the liner 110 before passing through the replaceable consumable 106 when the user inhales on/through the replaceable consumable 106. The liner may therefore act as a filter, to remove some of the aerosol particulate from the aerosol.

Figure 2:
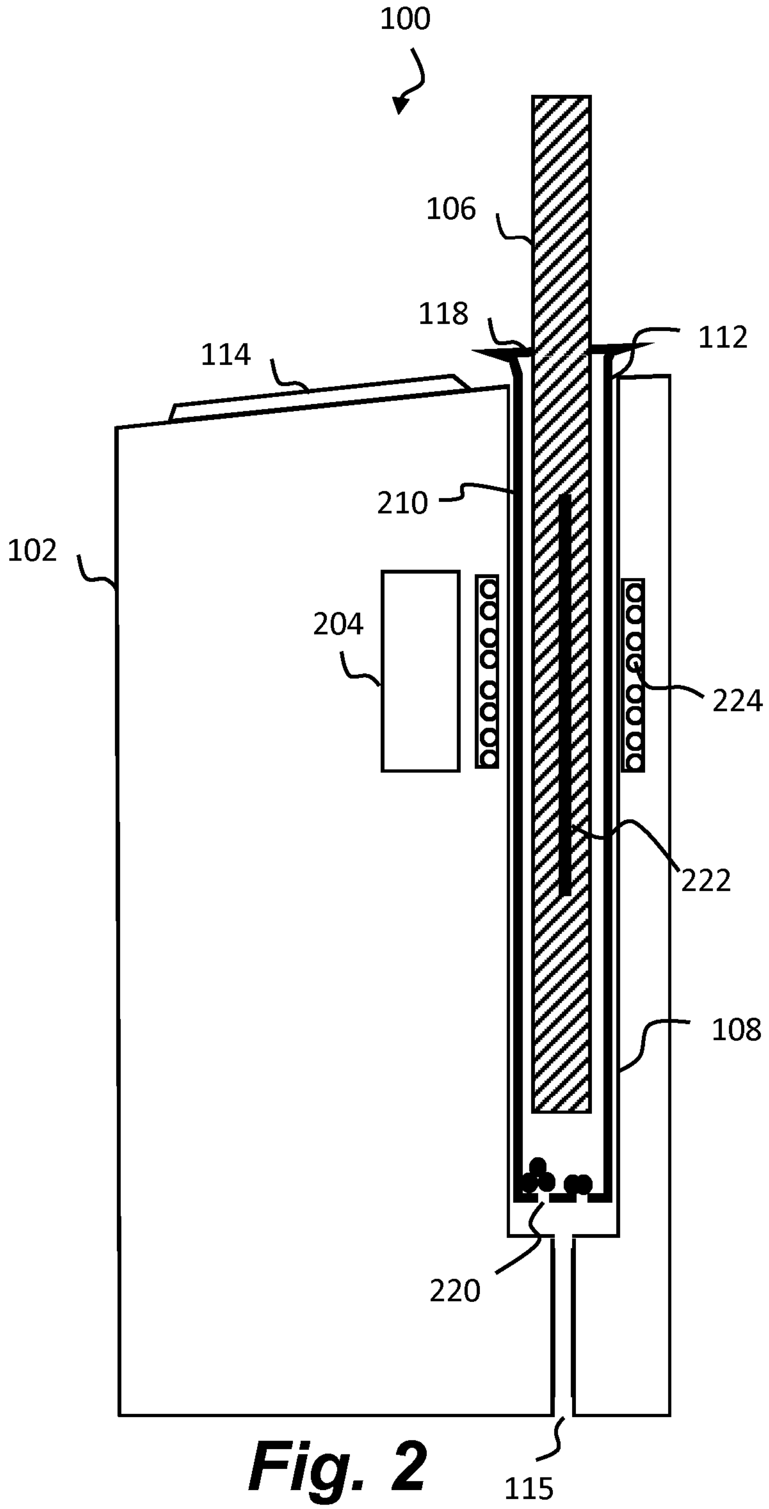
FIG. 2 shows a schematic cross-sectional view of another example of an aerosol provision device, the device comprising a removable liner.

In some examples the liner 110 defines one or more apertures, and FIG. 2 shows such an example. The device in FIG. 2 is similar to that shown in FIG. 1, however, in this example the liner 210 is not porous, but instead defines one or more apertures 220 through which air can pass. Air from an inlet 115 may flow through the apertures 220 before passing though the consumable 106. These apertures may be formed in the liner to allow air or gas to flow through the apertures, which may be useful if the liner is not porous or is impermeable. In other examples, the liner may be porous and further comprise one or more apertures. In one example the apertures are located at an end of the liner that is opposite to the end of the liner that receives the consumable. In some examples, the air inlet 115 may be arranged in proximity to the bottom of the chamber 108, and therefore in proximity to the apertures 220.

The device of FIG. 2 comprises an induction heater. The heater therefore may comprise a coil of wire 224 coiled around a susceptor 222, as well as the consumable 106, the liner 210 and the chamber 108. FIG. 2 depicts the coil of wire 224 extending into and out of the page. An oscillator 204 produces an oscillating electronic signal, which is passed though the coil 224, such that an oscillating magnetic field is generated. As a result of the magnetic field, Eddy currents flow within the electrically conductive susceptor 222 to heat the susceptor through Joule heating, which in turn heats the consumable 106. In addition, heat may also be generated in the susceptor by magnetic hysteresis losses. In the example of FIG. 2, the susceptor is depicted within the consumable 106, however in other examples the susceptor may be arranged on a surface of the consumable 106 or in thermal proximity to the consumable 106.

As a consequence of the varying magnetic field that is being produced, the liner 210 may, in some examples, be constructed from electrically insulating material. The material may also be thermally insulating. Accordingly, Eddy currents will not be induced within the liner 210, so the liner 210 will not heat up. By being thermally insulating, there is a reduction of heat transfer from the consumable and/or susceptor, to the outer surface of the liner. Together, these effects mean that the liner 210 remains relatively cool, so that it may be handled safely by a user, without injury. This can also mean that aerosol deposits on the liner surface are less likely to "bake" on the hot surface. Example materials suitable for use in a liner 210 include paper, cardboard and plastic. These materials are readily available, relatively inexpensive, and can be formed with specific dimensions easily. In some examples, the material has a thickness of about 10 to about 1500 micrometers.

Figure 3:
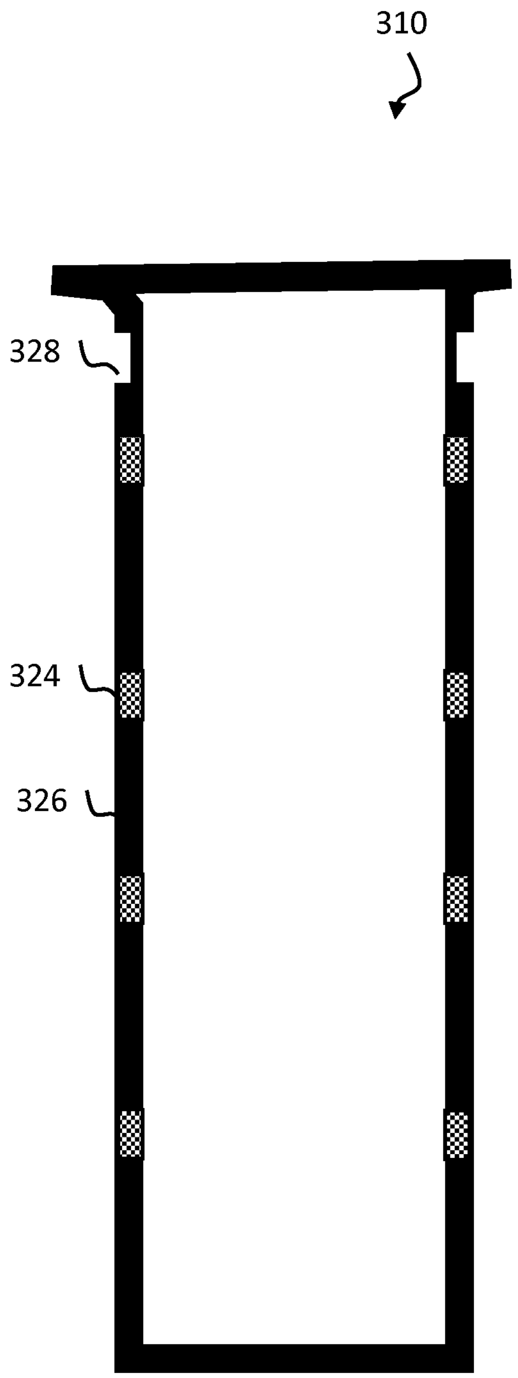
FIG. 3 shows a schematic cross-sectional view of an example removable liner for an aerosol provision device.

FIG. 3 depicts another example liner 310, where the liner 310 comprises a thermally conductive material configured to transfer heat from a heater to the replaceable consumable. This means that the liner (or certain components of the liner) conducts heat, such that when used with a heater, such as a resistive heater, heat can flow from the heater, through liner, to heat the consumable. In this example, walls of the liner 310 comprise thermally conductive regions 324 comprising the thermally conductive material disposed therein. These thermally conductive regions effectively transfer heat e.g., from a resistive heater arranged outside of the liner 310, to a consumable received within the liner 310. In other examples, the liner 310 is entirely thermally conductive. Example thermally conductive materials include metals, such as aluminum or steel, and metal alloys. In some examples, the thermally conductive material has a thickness of about 10 to about 1000 micrometers. In other implementations, the thermally conductive material may also act as a susceptor and be heated using an inductive heater (such as coil 224 in FIG. 2) arranged outside of liner 310.

In some examples the thermally conductive regions comprise conductive bars, filaments or sections of metal disposed within walls of the liner 310. Heat conducts along these metal bars, filaments or sections. This construction may allow heat to be channeled to certain points along the consumable.

The example liner of FIG. 3 also comprises one or more locking feature 328. In other examples, the liner 310 does not comprise locking features 328. The locking features 328 in this example are depicted as being a recess or indentation formed on an outer surface of the liner 310, however they may also be apertures. In other examples the locking features 328 may comprise one or more protrusions that extend from an outer surface of the liner 310. Regardless of their form, the locking features 328 are configured to engage or be engaged by a corresponding locking assembly of the device to restrict removal of the liner 310 from the device. Hence the liner 310 comprises features that allow the liner 310 to be locked in place by the device. This may be useful to stop a user from removing the liner 310 from the device while it is still hot. A corresponding locking assembly within the device (depicted in FIG. 4) may interlock with the locking features 328 of the liner 310.

The locking features 328 are configured to receive corresponding protrusions within the device. The protrusion and the locking feature may therefore interlock to stop the liner from being removed. In other examples apertures, recesses or indentations are defined by a surface within the device and the liner 310 comprises corresponding protrusions.

In another example, the liner 310 is made of a material that expands when heated, such that as the material expands, it locks the liner 310 in place. For example, the liner 310 may comprise one or more protrusions that expand into corresponding apertures, recesses or indentations formed in a surface of the device (such as in the chamber). In another example the dimensions of the liner may expand to engage the walls of the chamber and resist removal through increased friction at the interface between the liner and the chamber.

Figure 4:
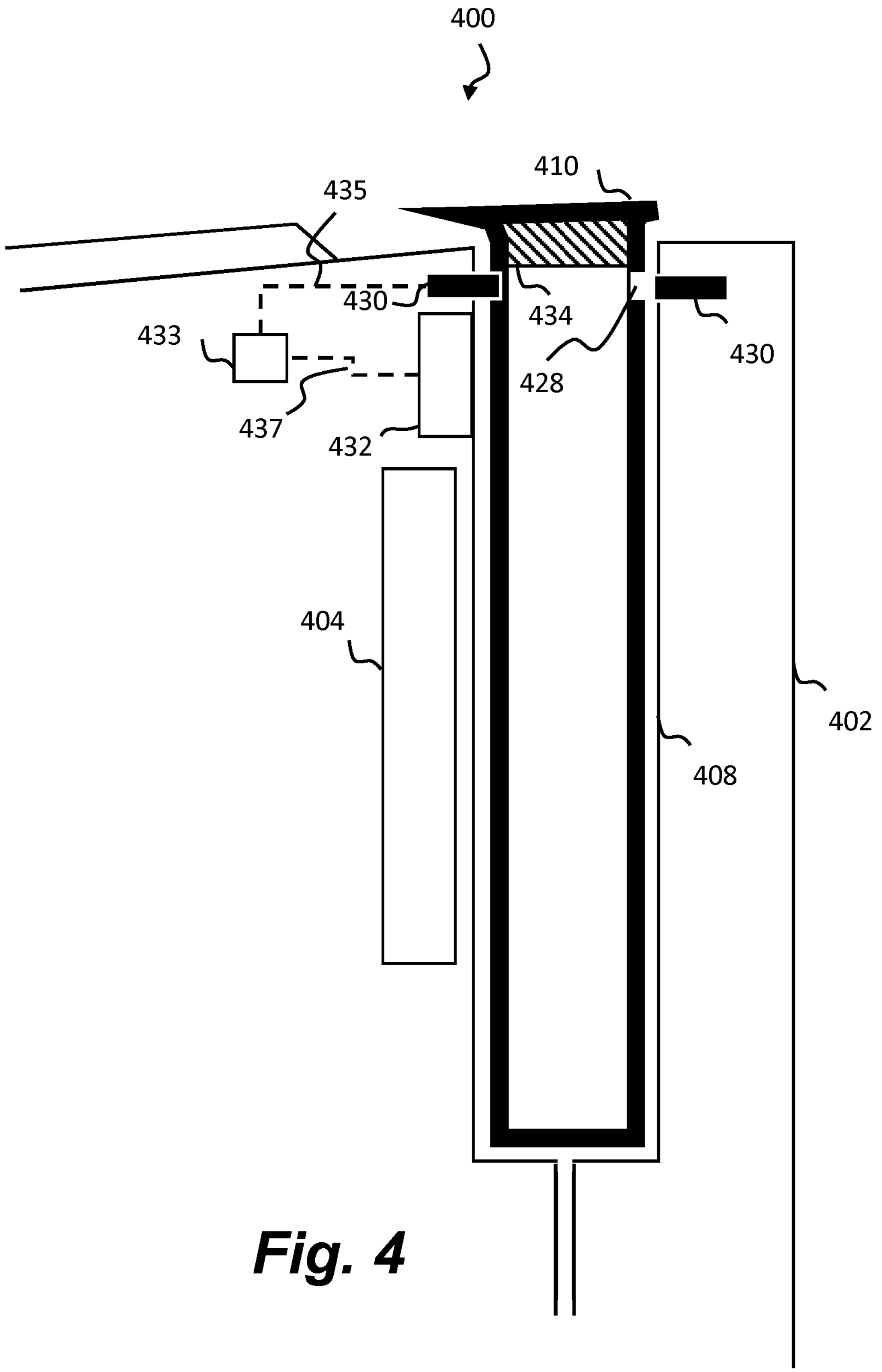
FIG. 4 shows a cross-sectional view of a portion of an example of a system for generating an aerosol, the device comprising a removable liner.

FIG. 4 depicts a portion of an example of a system 400 for generating an aerosol. The system 400 comprises a device 402 for generating an aerosol, the device 402 comprises a chamber 408 for receiving a replaceable consumable, and a removable liner 410 disposed between walls of the chamber 408 and the replaceable consumable. The system 400 may also comprise the replaceable consumable (not shown in FIG. 4). The device 402 comprises a heater 404 to heat the consumable.

The device 402 also comprises a locking assembly configured to restrict removal of the liner 410 from the chamber 408 until the liner has reached a threshold temperature and/or a threshold period of time has elapsed. The liner 410 in this example also comprises corresponding locking features 428, however in other examples, these may be absent from the liner 410. The locking assembly is depicted as comprising two members/protrusions 430 that can retract into walls of the chamber 408 and extend into corresponding apertures, recesses or indentations 428 defined by the liner.

In FIG. 4, for illustrative purposes, one of the members 430 is shown extending into the locking feature 428 of the liner, and the other member 430 is shown retracted into the device 402. Although two members 430 and two recesses 428 are shown, it will be appreciated that one, or any number, may suffice to lock the liner 410 in place. Other locking assemblies and locking features 428 may also be provided. For example, the locking assembly may comprise a collar that grips the liner 410 to hold it in place.

In one example, the members 430 may be moved by one or more motors or actuators (not shown). This movement may be triggered in response to a signal received from a controller 433. In one example, the controller 433 comprises one or more processors and memory. The controller 433 is communicatively coupled to components of the locking assembly, such as the members 430, or actuators. One or more wires 435, connect the controller 433 to the locking assembly, to allow control signals and/or data to be transmitted therebetween. The controller 433 can transmit a signal to the locking assembly, such as to the actuator(s). Upon receiving the signal, the actuators may cause the members 430 to retract or extend. For illustrative purposes, only a single wire 435 is shown; however both members 430 can be controlled by the controller 433.

The device 402 may be configured to lock the liner in place for a certain length of time and/or until a certain temperature has been reached, to allow safe removal of the liner. In one example the threshold period of time is defined as the time elapsed from when the heater was last switched off. The period of time may be dependent on various factors, such as the liner material, liner thickness, liner density, liner thermal conductivity, properties of the chamber/heater, and location relative to the chamber/heater, for example.

In one example, the memory of the controller 433 is configured to store a threshold period of time. The controller 433 therefore monitors a period of time elapsed from when the heater was last switched off and then determines if the monitored time has reached the threshold. Once the threshold has been reached, the controller 433 is configured to transmit a signal to the actuator(s) to cause the members 430 to retract, and release the liner 410. Similarly, the controller 433 may be configured to transmit a signal to the actuator(s) as the heater is switched on, for example, to cause the members to be extend, and engage the liner 410, thereby locking the liner 410 in place. The threshold period of time may be about 5, 10, 20, 30, 40, 50, 60 or more seconds, for example, after which the locking assembly is configured to unlock and release the liner 410 so that it can be removed. The threshold period of time can be predetermined, for example it may be set as period of time for a liner to cool to a temperature that would not cause discomfort if handled by a user following use of the heater within the device.

In some examples, the device further comprises a temperature sensor 432, and the locking assembly 430 is configured to restrict removal of the liner 410 from the chamber 408 until the temperature sensor 432 indicates that the liner 410 (such as the thermally conductive material of the liner 410) has reached a threshold temperature. Therefore, 410 temperature sensor 432 may permit the device to measure or monitor the temperature of the liner 410, or a temperature of a region in vicinity to the liner, to establish whether the temperature has reached a sufficient threshold that is safe for a user to handle. In an example, the temperature sensor 432 is communicatively coupled to the controller 433 via one or more wires 437. The temperature sensor 432 is therefore configured to measure the temperature of the liner 410, for example continuously or periodically. This measured data may be transmitted to the controller 433, via the wire 437.

In one example, the memory of the controller 433 is configured to store a threshold temperature. The controller 433 is therefore configured to determine if the monitored temperature falls below the threshold. Once the temperature falls below the threshold, the controller 433 is configured to transmit a signal to the actuator(s) to cause the members 430 to retract, and release the liner 410. Similarly, the controller 433 may be configured to transmit a signal to the actuator(s) as the heater is switched on, or if the temperature of the liner 410 increases above the temperature threshold, to cause the members 430 to be extend, and engage the liner 410, thereby locking the liner 410 in place.

In some examples, the threshold temperature for a metal, or thermally conductive, liner 410 is about 50-60 degrees Celsius for example. Therefore, once the device has measured that the threshold temperature has been reached, the locking assembly 430 may be configured to unlock, so that the user can remove the liner 410.

In some examples, members 430 may be mechanical or sprung loaded and retracted by a thermal actuator such as a wax motor or wax actuator. Alternatively, the members 430 may themselves be thermal actuators, such as a wax motor or wax actuator. Hence the members 430 may remain extended and engaged with the recess 428 due to the presence of heat, and retract once the liner has cooled below a threshold temperature, for example when the liner is less than 50° C. or when the liner is less than 60° C. In some examples therefore, the thermal actuators may operate without requiring instruction from a controller.

In some examples, the liner 410 further comprises a region of thermally insulating material 434 located at, or towards an end of the liner 410 that receives the replaceable consumable. In the example of FIG. 4, the thermally insulating region 434 is located at a top end of the liner 410 and is partially exposed even when the liner 410 is inserted into the device 402, to allow a user to easily grasp the liner 410 at this position. In other examples this region may be fully or partially received in the device 408. In some examples, the liner 410 is entirely thermally conductive apart from the region comprising thermally insulating material 434. This thermally insulating material 434 may be present on any liner described in relation to FIGS. 1-3, and is not limited to liners configured to be locked in to place. The inclusion of a thermally insulating region allows the user to hold the liner at this location without discomfort.

In FIG. 4, the material 434 is located at, or towards an end of the liner 410 that receives the replaceable consumable, however in other examples the thermally insulating material 434 may be located elsewhere on the liner 410. For example, the material 434 may be arranged along the outer surface of the liner 410. In one example, the thermally insulating material is arranged in "rib-like" structures around or along the liner 410. In one example the heater 404 is an induction heater, and the liner 410 may comprise "rib-like" structures of thermally insulating material on its surface to reduce thermal transfer from the heated consumable to the chamber 408.

Figure 5:
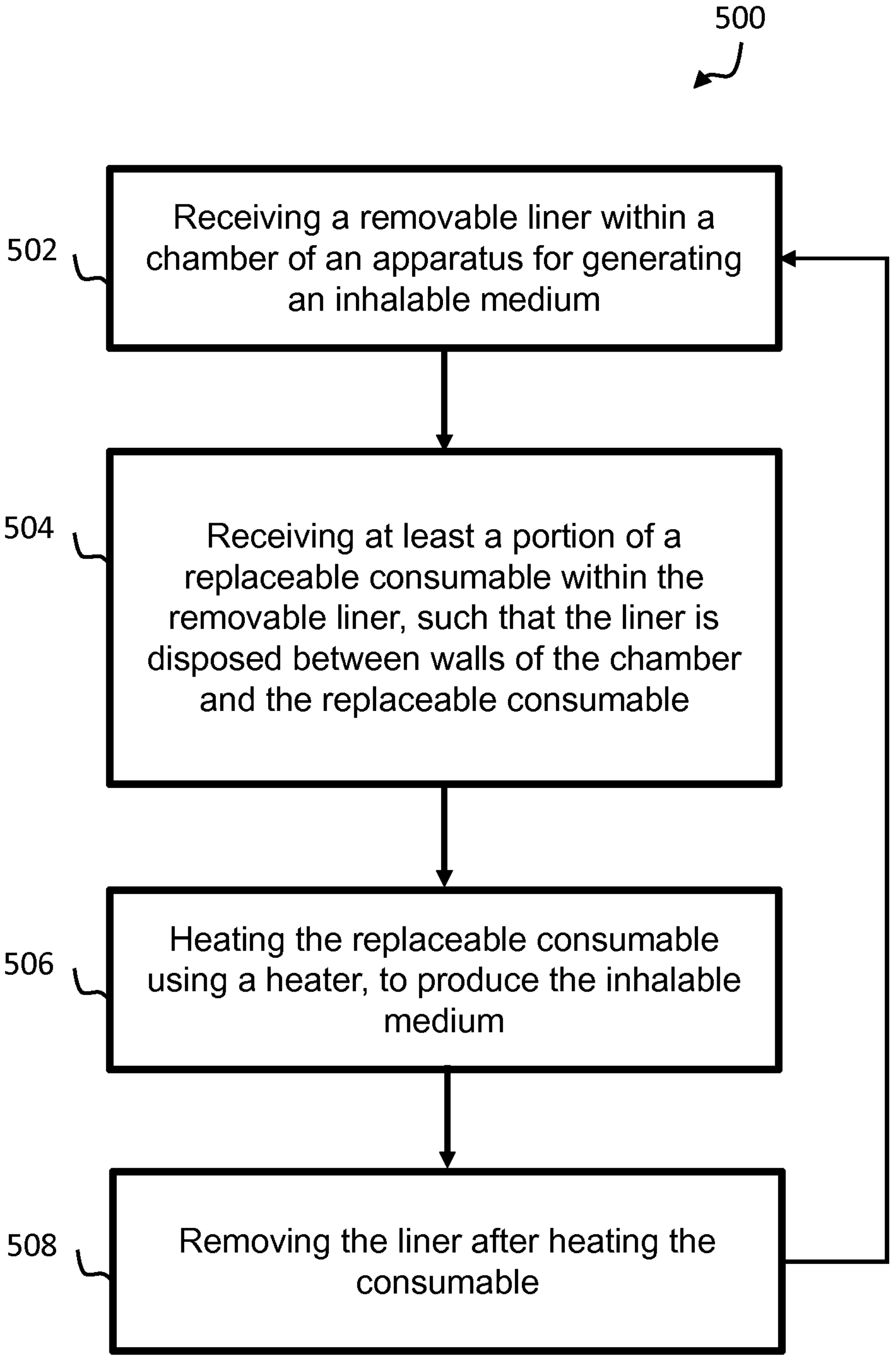
FIG. 5 shows an example method of generating an aerosol according to an example.

FIG. 5 depicts a flow diagram of a method 500 of generating an aerosol using a device, the device comprising a chamber. At block 502 the method comprises receiving a removable liner within the chamber. At block 504, the method comprises receiving at least a portion of a replaceable consumable within the removable liner, such that the liner is disposed between walls of the chamber and the replaceable consumable. At block 506, the method further comprises heating the replaceable consumable using a heater, to produce the aerosol.

In examples where the liner is a multiple-use liner, rather than a single use liner, blocks 504 and 506 may be repeated more than once. For example, a user may remove a spent consumable from the liner and replace with a fresh consumable.

The method may further comprise, at block 508, removing the removable liner from the chamber after heating the replaceable consumable. This may also comprise removing the replaceable consumable. Block 508 may also comprise disposing of the liner or cleaning the liner. After this, the method may comprise receiving a new liner, or a cleaned liner, within the chamber, and thus blocks 502, 504 and 506 may be repeated.

In a further example, the aerosol provision device is configured to detect the type of liner received in the chamber of the device, and in response to detecting the type of liner, the device may be configured to provide a specific heating profile based on the type of liner. For example, the device may read a barcode present on the liner, and the barcode is used to determine the type of liner. In another example the device may determine that the liner has certain electrical properties, and these are used to determine the type of liner. In a further example, the device may determine that the liner has specific dimensions, which are used to determine the type of liner. In a further example, the liner may comprise a computer-readable memory or other data storage structure which can be read by a corresponding reader in the device, the computer-readable memory or other data structure including data related the type of liner. The heating profile may mean that the heater operates for a specific time, or heats to a specific temperature. The heating profile may, for example, be selected as appropriate for a particular type of consumable which the liner is configured to receive. In this case, the liner is specific to a particular consumable or class of consumable, having predetermined properties, such as consumables of a predetermined size or having predetermined constituents and the heating profile is appropriate for these constituents. Alternatively or additionally, the heating profile may account for the presence of the liner itself, adjusting a heating profile from the case when no liner is present.

While it is described above that the liner, in one example, may comprise a liner including a memory or data storage structure including information indicating a type of liner, the memory or data-storage structure may additionally or alternatively comprise other information. For example, the memory or data storage structure may include information relating to a geographical location in which the liner was purchased or manufactured, other manufacturing information such as batch number, usage information, such as a number of inhalations the liner is to be used for, or a cumulative time of use of the liner, amongst others. In the latter example, either the liner or the device may also be provided with an indicator, such as an audio, visual, or haptic indicator to indicate to the user when the number of inhalations or the total cumulative time surpasses a threshold as indicated by the use information. This indicator can signify to the user that the liner requires changing and/or cleaning. It should also be appreciated that the memory or data-storage structure can be a read-only or a (re)writable memory or data structure.

In some examples, the aerosol provision device comprises a receptacle to store two or more liners (when not in use). A user can remove a liner from the receptacle and insert the liner into the heating chamber. Once all of the liners have been used, the user can replenish the receptacle with more liners. The user may select a suitable liner depending upon the consumable they are about to use.

In order to address various issues and advance the art, the entirety of this disclosure shows by way of illustration and example various embodiments in which the claimed invention may be practiced and which provide for a superior apparatus arranged to generate an inhalable medium. The advantages and features of the disclosure are of a representative sample of embodiments only, and are not exhaustive and/or exclusive. They are presented only to assist in understanding and teach the claimed and otherwise disclosed features. It is to be understood that advantages, embodiments, examples, functions, features, structures and/or other aspects of the disclosure are not to be considered limitations on the disclosure as defined by the claims or limitations on equivalents to the claims, and that other embodiments may be utilized and modifications may be made without departing from the scope and/or spirit of the disclosure. Various embodiments may suitably comprise, consist of, or consist in essence of, various combinations of the disclosed elements, components, features, parts, steps, means, etc. The disclosure may include other inventions not presently claimed, but which may be claimed in future.

The invention claimed is:

1. A removable liner configured to be used with an aerosol provision device, the device comprising a chamber for receiving a replaceable consumable, wherein:

the removable liner is configured to be received within the chamber of the aerosol provision device, between walls of the chamber and the replaceable consumable;

the removable liner is further configured to removably receive the replaceable consumable; and receive matter from the replaceable consumable;

the removable liner comprises a porous region and a non-porous region;

the removable liner comprises an open end at the top of the liner in which the consumable is received and wherein at the opposite bottom end the liner is closed;

the removable liner comprises a thermally insulating material disposed on an outer surface of the liner; and the porous region is configured such that air can pass from outside of the aerosol provision device and through the removable liner before passing through the replaceable consumable when the user inhales on or though the replaceable consumable.

2. The removable liner according to claim 1, wherein the removable liner defines one or more apertures.

3. The removable liner according to claim 1, wherein the removable liner comprises a thermally insulating material.

4. The removable liner according to claim 3, wherein the thermally insulating material comprises at least one of paper, cardboard, and plastic.

5. The removable liner according to claim 1, wherein the removable liner comprises a thermally conductive material configured to transfer heat from a heater to the replaceable consumable.

6. The removable liner according to claim 5, wherein the removable liner comprises a region of thermally insulating material located at or towards an end of the removable liner that receives the replaceable consumable.

7. The removable liner according to claim 5, wherein the removable liner comprises a locking feature, the locking feature configured to engage a locking assembly of the aerosol provision device to restrict removal of the removable liner from the device.

8. The removable liner according to claim 1, wherein the removable liner comprises a flavorant, wherein the flavorant is activated upon heating.

9. The removable liner of claim 1, wherein the porous region is configured such that particles of the replaceable consumable gather on or in the liner whilst aerosol is produced by heating the replaceable consumable passes through the removable liner.

10. The removable liner according to claim 1, wherein the thermally insulating material is located at or towards the open end of the removable liner.

11. The removable liner of claim 1, wherein the removable liner is entirely thermally conductive apart from a region comprising the thermally insulating material.

12. A system comprising:

an aerosol provision device, the device having a chamber for receiving a replaceable consumable;

a replaceable consumable at least partially disposed within the chamber; and the removable liner according to claim 1 disposed between walls of the chamber and the replaceable consumable, wherein the removable liner at least partially surrounds the replaceable consumable, in use.

13. The system according to claim 12, wherein the liner comprises a thermally conductive material, and the device comprises a heater arranged such that the thermally conductive material transfers heat from the heater to the replaceable consumable, in use.

14. The system according to claim 13, wherein the device comprises a locking assembly configured to restrict removal of the liner from the chamber until at least one of:

the thermally conductive material has reached a threshold temperature; or a threshold period of time has elapsed.

15. The system according to claim 14, wherein the device further comprises a temperature sensor, and the locking assembly is configured to restrict removal of the liner from the chamber until the temperature sensor indicates that the liner has reached the threshold temperature.

16. The system according to claim 13, further comprising a wax actuator configured to restrict removal of the liner from the chamber until the thermally conductive material has reached a threshold temperature.

17. The system according to claim 12, wherein the device is configured to detect a type of liner received in the chamber, and in response to detecting the type of liner, the device is further configured to provide a specific heating profile based on the type of liner.

18. The system according to claim 12, wherein the device comprises a receptacle configured to store two or more removable liners.

19. The system according to claim 12, further comprising a second removable liner, wherein:

the removable liner, has a first inner cross section;

the second removable liner has a second inner cross section different from the first inner cross section; and the chamber has a third inner cross section, the third inner cross section being substantially the same as an outer cross section of the removable liner and an outer cross section of the second removable liner.

20. A method of generating an aerosol using a device, the device comprising a chamber, the method comprising:

receiving the removable liner according to claim 1 within the chamber;

receiving at least a portion of a replaceable consumable within the removable liner, such that the liner is configured to be received between walls of the chamber and the replaceable consumable; and heating the replaceable consumable using a heater, to produce the aerosol.

21. A removable liner configured to be used with an aerosol provision device, the device comprising a chamber for receiving a replaceable consumable, wherein:

the removable liner is configured to be received within the chamber of the aerosol provision device, between walls of the chamber and the replaceable consumable; and the removable liner is further configured to removably receive the replaceable consumable; and receive matter from the replaceable consumable;

the removable liner is constructed of a single material;

the removable liner comprises a porous region and a non-porous region;

the removable liner comprises an open end at the top of the liner in which the consumable is received and wherein at the opposite bottom end the liner is closed; and the porous region is configured such that air can pass from outside of the aerosol provision device and through the removable liner before passing through the replaceable consumable when the user inhales on or through the replaceable consumable.

22. A removable liner configured to be used with an aerosol provision device, the device comprising a chamber for receiving a replaceable consumable, wherein:

the removable liner is configured to be received within the chamber of the aerosol provision device, between walls of the chamber and the replaceable consumable; and the removable liner is further configured to removably receive the replaceable consumable; and receive matter from the replaceable consumable;

the removable liner comprises a rib structure on its surface;

the removable liner comprises a porous region and a non-porous region;

the removable liner comprises an open end at the top of the liner in which the consumable is received and wherein at the opposite bottom end the liner is closed; and the porous region is configured such that air can pass from outside of the aerosol provision device and through the removable liner before passing through the replaceable consumable when the user inhales on or through the replaceable consumable.

* * * * *